United States Patent Office 3,086,506
Patented Apr. 23, 1963

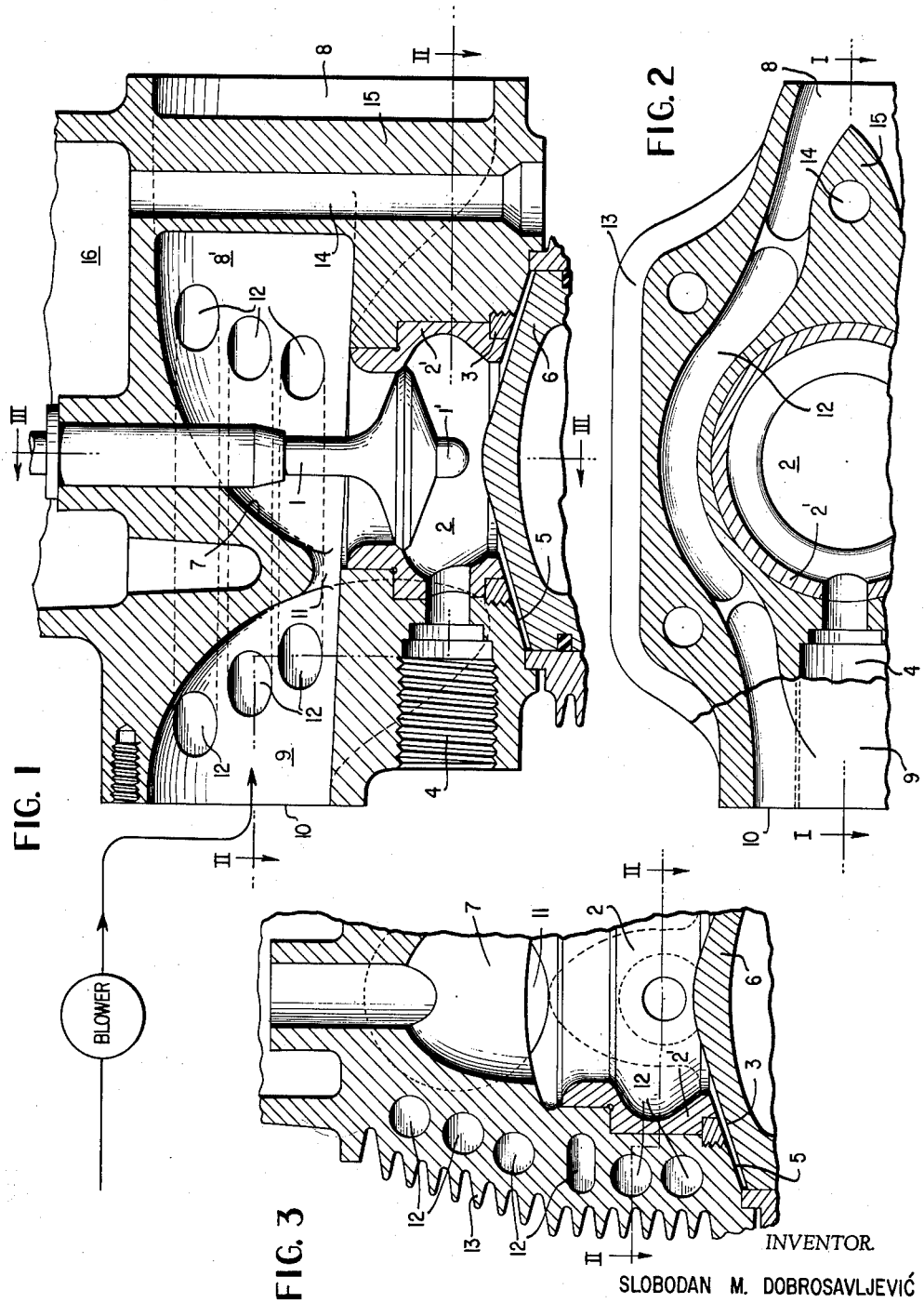

3,086,506
AIR-COOLED TWO-STROKE DIESEL ENGINE
Slobodan Milivoy Dobrosavljević, Perside Milen Kovic 5, Beograd, Yugoslavia
Filed July 6, 1961, Ser. No. 122,207
Claims priority, application Yugoslavia July 19, 1960
6 Claims. (Cl. 123—41.85)

The invention relates to a design of the cylinder head of two-stroke diesel engines having uni-flow scavenging through a single exhaust valve permitting the application of air cooling with relatively high specific outputs.

In present designs of engines of this type and in cases of high specific outputs, no rational balance can be realized between the determinant qualitative engine characteristics and the thermal load of the cylinder head, and especially of the exhaust valve and the combustion chamber.

The present invention resolves the problem of thermal discharge of the exhaust valve, of the combustion chamber and of the cylinder head itself for engines of the above mentioned type, chiefly by means of an appropriate combination of external and internal cooling, with a relatively small consumption of power for the blower drive. Namely, in the solution according to the present invention, which has only one exhaust valve in the combustion chamber placed coaxially in the cylinder head, in addition to the removal of heat by the fins of the cylinder head, cooling air is introduced from the blower into the exhaust channel of the cylinder head through an opening on the side opposite in relation to the exhaust port. One part of the cooling air flows into the exhaust channel of the cylinder head through a central slot located in the deflecting shroud directly above the exhaust valve orifice, while the larger part of the cooling air flows through a series of lateral channels arranged on both sides of the combustion chamber and the deflecting shroud. The flow of cooling air through the central slot and the lateral channels is effected by means of the air circulation caused by the discharge of exhaust gases which passes over the ports formed in the exhaust channel by the central slot and the lateral channels. By such an introduction of cooling air through a central slot and a series of lateral channels, direct cooling of the exhaust valve and its opening is made possible, and a considerable portion of the heat, transmitted from the combustion chamber and the deflecting shroud, is removed as well. In addition to this cooling, the exhause gas temperature is considerably lowered as a result of their mixing with the introduced cooling air.

In the solution of this basic idea, many characteristics of the over-all cylinder head and valve arrangement must be considered including the following design elements: taper design of the cylinder head face and of the piston crown; flat, toroid shape of the combustion chamber, and an exhaust valve of markedly convex shape on the interior side. By an appropriate combination of forms of these elements, both a favorable location of the fuel injector, advantageous flow sections for the exhaust gases and an efficient cooling of the piston head are made possible and sufficiently high compression ratios are ensured. Moreover, the markedly convex valve permits the placing of a central boss of high temperature level, for the excitation of primary combustion of the central fuel jet.

Accordingly, it is an object of the present invention to provide an improved design of a cylinder head for a two-stroke diesel engine.

It is another object of the present invention to provide a cylinder head for a two-stroke diesel engine having uni-flow scavenging through a single exhaust valve which permits the application of air cooling with relatively high specific outputs.

These and other objects, features and advantages of the present invention will become more obvious from the following description when taken in connection with the accompanying drawings, which show, for purposes of illustration only, a preferred embodiment in accordance with the present invention, and wherein:

FIGURE 1 is a cross-sectional view of the cylinder head in accordance with the present invention;

FIGURE 2 is a partial cross-sectional view taken along section line II—II in FIGURE 1; and FIGURE 3 is a partial cross-sectional view of the preferred embodiment taken along section line III—III in FIGURE 1.

As illustrated in FIGURE 1, the exhaust valve 1 is seated coaxially in the separate combustion chamber 2 which is of toroid shape. The combustion chamber 2 is formed by a separate element 2' inserted into the cylinder head and abutting against the stepped cylindrical part 1'. The element 2' is fixed tightly by a threaded ring 3. An injector of conventional construction is placed in the bore 4. The cylinder head 5 is provided with a tapered front face and the piston 6 is provided with a tapered crown. The front face and the crown of the cylinder head and the piston, respectively, are the closest distance apart at the TDC of the piston. The valve 1 has an approximately double-conical form and bears in its center a boss 1' on which impinges the fuel jet, for the excitation of primary combustion. Above the combustion chamber 2 and in the plane of symmetry of the cylinder head, there is an exhaust channel 8' formed by the deflecting shroud 7, and extending to the exhaust port 8. A chamber 9 is provided in the opposite side of the cylinder head relative to the exhaust port 8 for the purpose of feeding cooling air from the standard blower through the port 10. This chamber 9, in its downward extension embraces the injector bore, and communicates with the exhaust channel through both the central slot 11 arranged between the exhaust valve orifice and the deflecting shroud 7, and a series of lateral channels 12, which surround the combustion chamber and the deflecting shroud symmetrically on both sides. The slot 11 and the channels 12 provide internal cooling of the cylinder head and of the exhaust valve. In addition to such internal cooling, an additional external cooling of the cylinder head is also provided by the cooling fins 13. The valve lifting rod passes through the bore 14 in the plane of symmetry of the cylinder head, drilled through the profiled boss 15 inside the exhaust channel. Above the exhaust channel a symmetrical chamber 16 is provided for the exhaust valve control gear (not shown), which chamber is closed by an appropriate cover.

While I have shown and described the preferred embodiment in accordance with the present invention, it is understood that the same is not limited thereto but is susceptible of many changes and modifications within the spirt and scope of the present invention; and I, therefore, do not wish to be limited to the details shown and described herein but intend to cover all such changes and modifications as are encompassed by the scope of the appended claims.

I claim:

1. In a cylinder head for a two-stroke air-cooled diesel engine having uni-flow scavenging and provided with a blower, a combustion chamber, an exhaust channel for said combustion chamber formed in part by a deflecting shroud and communicating with an exhaust port arranged in one side of said cylinder head, a single exhaust valve for said chamber, means for supplying a combustible mixture to said chamber including an injector bore in said cylinder head, and means for internally cooling said cylinder head including an air inlet for cooling air arranged in the cylinder head essentially opposite to said exhaust port, a cooling air chamber connected to said air inlet, a central slot interconnecting said cooling air chamber and said exhaust channel arranged between said deflecting shroud and the valve orifice for said exhaust valve, and a plurality of lateral ducts formed in said cylinder head and interconnecting said cooling air chamber and said exhaust channel, said lateral ducts forming a pattern substantially encircling said combustion chamber and said deflecting shroud.

2. A two-stroke air-cooled diesel engine as defined in claim 1, wherein said combustion chamber is a central, flat, toroidal chamber having said exhaust valve arranged essentially coaxially therein.

3. A two-stroke air-cooled diesel engine as defined in claim 2, wherein said exhaust valve includes a valve disk having a pronounced convexity on its internal side, with respect to the combustion chamber, and a central boss on said internal side, said central boss being adapted for the excitation of said mixture supplied to the combustion chamber.

4. A two-stroke air-cooled diesel engine as defined in claim 3, wherein said cylinder head includes a cylinder space below said combustion chamber and a piston arranged in said cylinder space, said piston having a tapered crown, the upper surface of the cylinder space facing the piston also being tapered.

5. A two-stroke air-cooled diesel engine as defined in claim 4, wherein said cylinder head includes external fins for dissipating heat therefrom.

6. In a two-stroke air-cooled diesel engine having uniflow scavenging and provided with a blower, and a cylinder head including a combustion chamber, an exhaust channel for said combustion chamber formed in part by a deflecting shroud and communicating with an exhaust port arranged in one side of said cylinder head, a single exhaust valve for said chamber, and means for supplying a combustible mixture to said chamber including an injector bore in said cylinder head, the improvement comprising means for internally cooling said cylinder head including an air inlet for cooling air arranged in the cylinder head essentially opposite to said exhaust port, a cooling air chamber connected to said air inlet, a central slot interconnecting said cooling air chamber and said exhaust channel formed in part by said deflecting shroud and located adjacent the valve orifice for said exhaust valve, and a plurality of lateral ducts formed in said cylinder head and interconnecting said cooling air chamber and said exhaust channel, said lateral ducts forming a pattern substantially encircling said combustion chamber and said deflecting shroud.

References Cited in the file of this patent

UNITED STATES PATENTS

| | | |
|---|---|---|
| 1,712,539 | Willgoos | May 14, 1929 |
| 2,416,866 | Bronander | Mar. 4, 1947 |

FOREIGN PATENTS

| | | |
|---|---|---|
| 536,999 | Great Britain | June 4, 1941 |